United States Patent Office 3,840,531
Patented Oct. 8, 1974

3,840,531
PROCESS FOR PREPARING 7 - (α-HYDROXY-α-PHENYL)ACETAMIDO - 3 - (1 - METHYL-1H-TETRAZOL - 5 - YLTHIOMETHYL)-3-CEPHEM-4-CARBOXYLIC ACID AND DERIVATIVES THEREOF
James M. Greene, Indianapolis, Ind., assignor to Eli Lilly and Company, Indianapolis, Ind.
No Drawing. Filed Mar. 21, 1972, Ser. No. 236,764
Int. Cl. C07d 99/24
U.S. Cl. 260—243 C
9 Claims

ABSTRACT OF THE DISCLOSURE

A process for preparing 7-(α-hydroxy-α-phenyl)acetamido - 3-(1-methyl-1H-tetrazol-5-ylthiomethyl)-3-cephem-4-carboxylic acid by replacing the acetoxy group of a 7-acylamidocephalosporanic acid with a tetrazolylthio group, cleaving the 7-acyl function to produce the corresponding nucleus, and acylating the nucleus with anhydro-O-carboxymandelic acid.

BACKGROUND OF THE INVENTION

This invention is directed to an improved process for preparing 7-(α-hydroxy-α-phenyl)acetamido-3-(1-methyl-1H-tetrazol-5-ylthiomethyl)-3-cephem-4-carboxylic acid as well as ester derivatives and pharmaceutically acceptable salts thereof.

Compounds which are the subject of the process of this invention are claimed in copending U.S. application Ser. No. 817,556 filed Apr. 18, 1969. According to the process described in this copending application for preparing the compounds claimed therein, the compounds which are the subject of the process of this invention can be prepared by displacing the 3-acetoxy group of 7-aminocephalosporanic acid by reaction with 1-methyl-1H-tetrazole-5-thiol and then acylating the 7-amino group using a suitably protected acid halide or mixed anhydride of D-mandelic acid.

It has now been discovered that it is possible to prepare 7 - (α-hydroxy-α-phenyl)acetamido-3-(1-methyl-1H-tetrazol-5-ylthiomethyl)-3-cephem-4-carboxylic acid and derivatives thereof by a process which forms the basis of this invention and which results in an improvement in terms of both product yield and product quality over the process as defined in copending U.S. application Ser. No. 817,556.

SUMMARY OF THE INVENTION

Broadly, this invention relates to a process for preparing a cephalosporin of the formula

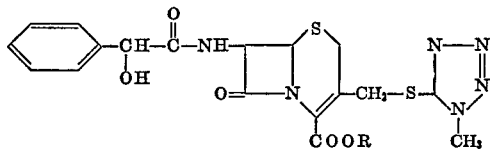

which comprises (1) reacting a 7-acylamido-3-acetoxymethyl compound of the formula

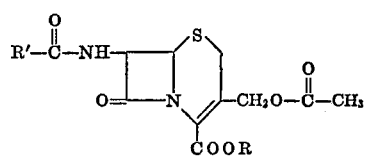

in which R' is hydrogen, $C_1$ to $C_3$ alkyl, or 4-amino-4-carboxybutyl, and A is hydrogen or a carboxy protecting group, with 1-methyl-1H-tetrazole-5-thiol or an alkali, alkaline earth metal or ammonium salt thereof to produce a 7 - acylamido - 3-(1-methyl-1H-tetrazol-5-ylthiomethyl) compound having the formula

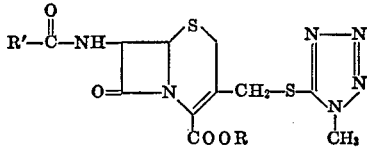

(2) cleaving the 7-acylamido-3-(1-methyl-1H-tetrazol-5-ylthiomethyl) compound to produce a 7-amino-3-(1-methyl-1H-tetrazol-5-ylthiomethyl) compound having the formula

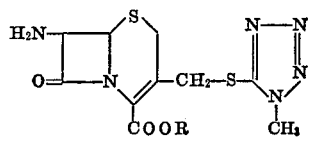

and (3) acylating the resulting 7-amino compound with anhydro-O-carboxymandelic acid having the formula

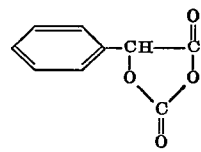

to produce the aforementioned cephalosporin.

DETAILED DESCRIPTION OF THE INVENTION

The process of this invention can be broadly depicted by the following reaction scheme:

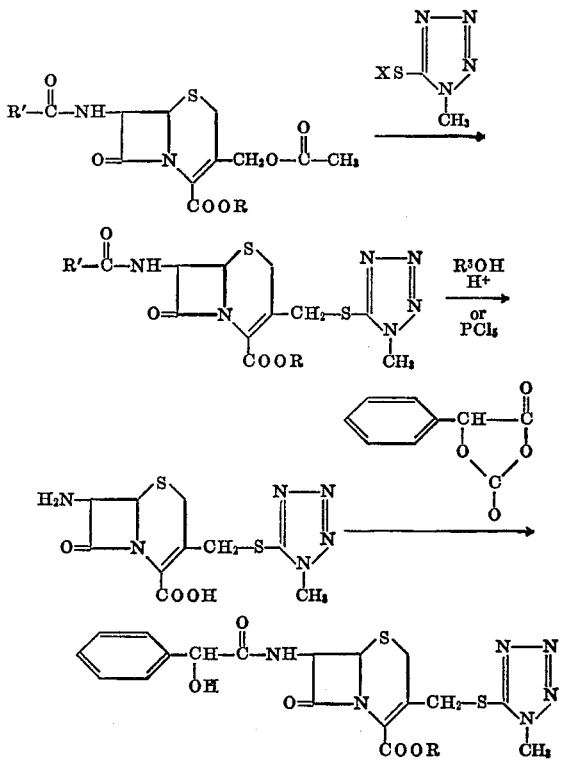

In the above reaction scheme, R and R' are as herein defined. X represents hydrogen, ammonium, or an alkali or alkaline earth metal, with appropriate modification as may be dictated by valence considerations. $R^3$ represents a $C_1$-$C_4$ alkyl group.

One of the starting materials which is employed in the process of this invention is the readily available cephalosporin C. Another is 7-aminocephalosproanic acid (7-ACA) suitably protected in the 7-position with a formyl or a lower alkanoyl moiety. Such an N-acylated 7-ACA is readily available by techniques well recognized in the art. One such technique involves the reaction of 7-ACA with an acid which corresponds to the acyl function which is to be substituted in the 7-position. Thus, 7-ACA is reacted with an acid such as formic acid, acetic acid, propionic acid, butyric acid, and the like, to produce the corresponding acylated 7-ACA. Since this reaction is accompanied by the formation of one mole of water per each mole of acylated 7-ACA, it is highly preferred to carry out the acylation in the presence of a suitable water acceptor. A highly preferred reagent for this purpose is an acid anhydride, such as for example, acetic anhydride, propionic anhydride, and the like. In the instance in which the acyl function is formyl, it is possible to employ as acylating agent a pre-formed formic-acetic anhydride which can be prepared from the reaction of sodium formate and acetyl chloride.

In accordance with the process of this invention, the N-acyl 7-aminocephalosporanic acid is reacted with a 1-methyl-1H-tetrazole-5-thiol, typically in the form of its ammonium, alkali metal or alkaline earth metal salt. Typical of the salts of 1-methyl-1H-tetrazole-5-thiol which can be used therefor are those of sodium, potassium, lithium, ammonium, calcium, magnesium, and the like. The displacement of the acetoxy group with the methyltetrazolylthio moiety generally is accomplished in an aqueous medium at a pH which is neutral, slightly acidic or slightly basic and which is within the range of from pH 5.0 to pH 9.5. Preferably, the pH of the initial reaction mixture will be from about 6.5 to about 9.0, and will gradually be lowered during the period of reaction to a pH within the range of from about 5.5 to about 8.5. The N-acyl 7-ACA typically is added to the aqueous medium, and the desired pH of the mixture is achieved by addition of a suitable buffering agent, such as a phosphate, for example, trisodium phosphate, tripotassium phosphate, and the like. Other suitable pH adjusting reagents include moderately weak bases such as ammonium hydroxide, sodium carbonate, sodium bicarbonate, and the like. Once the desired pH of the reaction medium has been obtained, the reaction proceeds by heating the mixture to a temperature of from about 50° C. to about 100° C., and preferably to a temperature of about 70° C. The reaction is completed within a period of from about 2 to about 8 hours, and preferably from about 2 to about 4 hours.

During the reaction which displaces the group in the 3-position, the pH of the reaction medium generally drifts moderately downward. The lowering of the pH during the course of the reaction is not harmful to the overall reaction, and therefore it is not necessary to add reagents which would maintain the reaction mixture at a constant pH.

The next step in the reaction sequence is directed to cleavage of the acyl function at the 7-position to produce the free amine function. If so desired, this can conveniently be accomplished without isolation of the methyltetrazolylthio derivative from the previous step. Preferably, this derivative will not be isolated, and in such an instance, the pH of the reaction mixture is lowered to the range of from about pH 1 to about pH 3 by addition of acid. Preferably, the cleavage of the acyl function is conducted at a pH of about 2.0. Generally, a mineral acid such as hydrochloric acid, sulfuric acid, phosphoric acid, and the like is employed. The acyl function is then cleaved under acid conditions in the presence of an alcohol. In general, the alcohol which is employed will be a lower alkyl alcohol, such as methanol, ethanol, isopropyl alcohol, and the like. When the starting material and therefore the ultimate product is the free acid, the 3-substituted 7-amino-cephalosporin is isolated from the reaction mixture by adjusting the pH of the reaction mixture to the isoelectric point (about 3.9). The resulting product precipitates at this pH and is readily removed from the reaction mixture. In the event that the starting material and therefore the product is an ester of the 3-substituted 7-aminocephalosporin, this product can be isolated from the reaction mixture simply by rendering the reaction medium alkaline by the addition of a suitable base.

Other methods are also available for cleaving the acyl function at the 7-position of the methyltetrazolylthio derivative. For example, the cleavage can be accomplished by reacting the 7-acylated methyltetrazolylthio derivative in the presence of a phosphorus halide, such as phosphorus pentachloride, and in accordance with the method described in U.S. Pat. No. 3,549,628. In the instance of the 3-methyltetrazolylthio derivative of cephalosporin C, the cleavage of the 7-acyl function additionally can be carried out in the presence of a nitrosating agent, such as nitrosyl chloride, and in accordance with the method described in U.S. Pat. No. 3,188,311.

The final step of the process of this invention involves the acylation of the 7-amino function of the cephalosporin to produce an α-hydroxy-α-phenylacetamido group in the 7-position. It has been found to be highly advantageous to use anhydro-O-carboxymandelic acid for this purpose. U.S. Pat. No. 3,167,549 mentions the possible use of anhydro-O-carboxymandelic acid for acylating the 7-amino function of a cephalosporin but fails to indicate its exceptional suitability for the acylation of 3-substituted-thio-methyl 7-aminocephalosporins. It has been discovered in accordance with the process of this invention that increased product yield as well as improved product purity are available by acylating 7-amino 3-(1-methyl-1H-tetrazol-5-ylthiomethyl)-3-cephem-4-carboxylic acid or a derivative thereof using anhydro-O-carboxymandelic acid as opposed to other recognized acylating agents, such as acid chlorides, mixed anhydrides, and the like. Anhydro-O-carboxymandelic acid is readily available from the reaction of mandelic acid with phosgene.

Should the free acid of the 3-substituted 7-amino-cephalosporin be employed as starting material in the acylation step of the process of this invention, the reaction generally is carried out in an aqueous medium and at a neutral or slightly acidic pH. The pH will generally be within the range of from about 5.0 to about 7.0, and preferably within the range from about 6.5 to about 7.0. The pH of the reaction mixture is obtained and maintained using any suitable reagent, such as, for example, a salt of a strong base and a weak acid such as sodium bicarbonate. The pH can also be obtained and maintained by employing a suitable buffering agent, such as any of those mentioned hereinabove or other equivalent art-recognized buffering agents. The nature of the buffering agent employed is not a critical feature of this invention. The reaction of the 7-amino cephalosporin with the anhydro-O-carboxymandelic acid is equimolar; however, a slight molar excess of from about 10% to about 50% of the anhydro-O-carboxymandelic acid usually is employed to assure minimal loss and maximum reaction of the more expensive cephalosporin compound. The reaction time, in general, is quite rapid, and the reaction will be completed within about 0.5 to about 2 hours. The time of reaction necessarily is dependent upon the temperature at which the reaction is carried out, the lower the temperature the longer the reaction time. The acylation generally will be conducted at a temperature of from about 20° C. to about 50° C., with ambient room temperature being especially preferred. The resulting product is obtained as its free acid or in the form of a suitable alkali metal or alkaline earth metal salt depending upon the conditions employed to isolate the product. Under moderately strong acid conditions, the free acid will be recovered whereas a salt will be obtained upon addition of an appropriate salt of the desired cation such as, for example, an acetate salt of sodium, potassium or the like.

When the 7-aminocephalosporin is employed in the form of its ester, it will be isolated as such. In order to obtain an active antibiotic, it will be necessary to cleave the ester function to produce the free acid or acceptable pharmaceutical salt thereof.

As mentioned hereinabove, the initial starting material which is employed in the process of this invention can be a 7-acylamido cephalosporanic acid itself or an ester derivative thereof. Protection of the carboxyl function is not essential in carrying out the process of this invention and, preferably, will be avoided. However, the cephalosporin art recognizes many carboxy protecting groups, any of which can be employed in the process of this invention. Preferably, if the cephalosporin starting material, which is employed contains a carboxy protecting group, such group will be selected from $C_1$–$C_6$ alkyl, 2,2,2-trihaloethyl, $C_5$–$C_7$ tert-alkenyl, $C_5$–$C_7$ tert-alkynyl, benzyl, nitrobenzyl, tetrahydropyranyl, succinimidomethyl, phthalimidomethyl, methoxybenzyl, dimethoxybenzyl, cyanomethyl, nitrophenyl, dinitrophenyl, 2,4,6 - trinitrophenyl, bis(p-methoxyphenyl)methyl, triphenylmethyl, benzhydryl, benzyloxymethyl, $C_2$–$C_6$ alkanoyloxymethyl, $C_2$–$C_4$ alkanoyl, phenacyl, or other like protecting groups.

The following examples are provided for the purpose of illustrating the process of this invention and are not intended to limit the scope thereof.

EXAMPLE I

7-formamido-cephalosporanic acid

In a 2.1, one-neck flask, 800 ml. of 98% formic acid was cooled to —10° C. in an ice-acetone bath. Acetic anhydride (150 ml.) was added over 10 minutes while maintaining the temperature below 0° C. 7-Aminocephalosporanic acid [100 g., (0.37 m.)] was added and the mixture was stirred for 10 minutes until solution was nearly complete. The solution was placed under vacuum and its volume reduced to 225 g. of a tan foam. Ethyl acetate (500 ml.) was added, and the mixture was stirred and then filtered to remove a small amount of insoluble material and reduced to 135 g. of foam. About 500 ml. of ethyl acetate was added, and the mixture was stirred in an ice bath. A solid crystallized. The solid was collected, washed with 200 ml. of ethyl acetate and dried to give 95.8 g. (80%) of 7-formamidocephalosporanic acid, m.p. 135–37° C.

The following observed values express the nuclear magnetic resonance spectrum, the infrared spectrum, the ultraviolet spectrum, and the elemental analysis for the product:

NMR $\delta$(DMSOd$_6$):
  2.00 (s, 3, acetyl-CH$_3$)
  3.54 (s, 2, C2 methylene)
  4.55, 5.12 (m, 3, C3 methylene, C6 proton)
  5.63, 5.86 (q, 1, C7 proton)
  8.12 (s, 1, formyl proton)
  9.78, 10.0 (d, 1, amide proton).

IR (mull) absorption maxima: 1770 ($\beta$-lactam), 1748, 1710, 1655 (ester, carboxyl and amide carbonyl) cm.$^{-1}$.

UV (pH 6 buffer): $\xi_{259}$—9000.

Analysis.—Calcd. for $C_{11}H_{12}N_2O_6S$: C, 44.00; H, 4.03; N, 9.33; S, 10.68. Found: C, 43.84; H, 3.76; N, 9.20; S, 10.54.

EXAMPLE II

7 - (5' - amino - 5'-carboxy)valeramido-3-(1-methyl-1H-tetrazol-5-ylthiomethyl)-3-cephem-4-carboxylic acid To 800 ml. of water was added 27.7 g. (0.2 m.) of 1-methyl-1H-tetrazole-5-thiol, sodium salt, and the mixture was heated to 70° C. The sodium salt of cephalosporin C [88.0 g. (0.2 m.)] was added, and the mixture was maintained at 70° C. for about 2 hours. The mixture was then cooled to 20° C., and the pH was adjusted to about 9 by addition of 50% aqueous sodium hydroxide. About 52 g. (0.4 m.) of propionic anhydride was added to the mixture over a ten minute period during which time the pH was maintained above 8.0 by addition of 50% aqueous sodium hydroxide. The mixture was cooled, and one liter of tetrahydrofuran was added. The pH was then adjusted to about 1 by addition of concentrated hydrochloric acid. The mixture was then saturated with sodium chloride, the layers separated, and the organic layer dried over anhydrous magnesium sulfate. The organic solution was evaporated to a foam residue, and the residue was dissolved in methanol. Upon cooling, a solid crystallized. The solid was filtered, washed and dried to give 65 g. (60%) of 7-(5'-amino-5'-carboxy)valeramido-3-(1-methyl - 1H - tetrazol - 5 - ylthiomethyl)-3-cephem-4-carboxylic acid.

EXAMPLE III

7-amino-3-(1-methyl-1H-tetrazol - 5 - ylthiomethyl) - 3-cephem-4-carboxylic acid In 200 ml. of tetrahydrofuran was suspended 26.0 g. (0.05 m.) of 7-(5'-amino-5'-carboxy)valeramido-3-(1-methyl - 1H - tetrazol - 5 - ylthiomethyl)-3-cephem-4-carboxylic acid, and the mixture was cooled to about —10° C. About 2 ml. of quinoline was added, and, with the temperature of the mixture maintained below about 35° C., 41 ml. (0.6 m.) of acetyl chloride was added. The mixture was then cooled to —12° C., and 53 ml. (0.33 m.) of diethylaniline was added. The mixture was recooled to —12° C., and 20.8 g. (0.1 m.) of phosphorus pentachloride was added. The mixture was stirred at —12° C. for about 0.5 hours, and then was cooled to —40° C. About 40 ml. of ethylene glycol was added, and the mixture was maintained to 0° C. to 5° C. for two hours. The mixture was cooled to —12° C., and 30 ml. of water was added. The pH of the mixture was adjusted to 3.9 by addition of ammonium hydroxide, and the mixture was stirred for 0.5 hours during which time solid precipitated and was then collected by filtration. The solid was washed successively with water and acetone and then dried to yield 7-amino-3-(1-methyl-1H-tetrazol-5-ylthiomethyl)-3-cephem-4-carboxylic acid.

EXAMPLE IV

7 - amino - 3 - (1-methyl-1H-tetrazol-5-ylthiomethyl)-3-cephem-4-carboxylic acid In a 500 ml., 3-neck flask equipped with a stirrer and thermometer, 21.0 g. (0.07 m.) of 7-formamidocephalosporanic acid and 9.68 g. (0.07 m.) of 1-methyl-1H-tetrazole-5-thiol, sodium salt were suspended in 200 ml. of water. The pH was adjusted to 6.9 with concentrated ammonium hydroxide, and the mixture was heated for 3½ hours at about 70° C. The final pH of the mixture was 5.9. The solution was cooled and washed with two 100 ml. portions of ethyl acetate. The organic wash was discarded, and the aqueous layer was layered with a mixture of 140 ml. of ethyl acetate and 160 ml. of tetrahydrofuran. The pH was adjusted to 2.0 with concentrated HCl, the layers were separated, and the organic layer was washed with two 40 ml. portions of water and then with 100 ml. of saturated sodium chloride. The organic layer was dried over anhydrous magnesium sulfate and evaporated to 18.0 g. of yellow foam. The foam was dissolved in a mixture of 160 ml. of methanol and 24 ml. of concentrated hydrochloric acid. The solution was stirred for 2½ hours. Water (500 ml.) was added, and the solution was washed with two 300 ml. portions of ethyl acetate. The aqueous layer was placed under vacuum to remove organic solvents and then was cooled. The pH was adjusted to 3.9 by addition of concentrated ammonium hydroxide. Solid separated almost immediately. The mixture was stirred for about one hour in an ice bath, filtered, washed with water, and dried, to give 10.12 g. (44%) of 7-amino-3-(1-methyl-1H-tetrazol-5-ylthiomethyl)-3-cephem-4-carboxylic acid.

NMR δ(D₂O/NaHCO₃):
 3.58, 3.71 (d, 2, C2)
 4.12 (s, 3, tetrazole CH₃)
 4.17, 4.30 (d, 2, C3 methylene)
 5.03, 5.12 (d, 1, C6 proton)
 5.43, 5.52 (d, 1, C7 proton)
UV (pH 6 buffer): $\epsilon_{272}$—10,000

EXAMPLE V

Anhydro-O-carboxymandelic acid

In a 250 ml., 3-neck flask, equipped with a Dry Ice-acetone condenser, a stirrer, a thermometer and an inlet tube, 15.2 g. (0.1 m.) of D(—)mandelic acid was dissolved in 150 ml. of dry tetrahydrofuran (THF). Phosgene [14.2 ml., 19.7 g. (0.2 m.)] was collected from a cylinder under a Dry Ice-acetone condenser. The phosgene was allowed to distill into the reaction flask through the inlet tube opening above the surface of the liquid. The distillation required about 1 hour and the temperature rose from 23° C. to 32° C. The solution was then heated to 45° C. for a period of 7 hours. The reaction mixture was reduced to 17.5 g. of off-white solid. The solid was dissolved in 70 ml. of hot carbon tetrachloride. Upon cooling, a solid crystallized and was filtered and washed with cold carbon tetrachloride to give 14.8 g. (83%) of anhydro-O-carboxymandelic acid m.p. 74–76° C. dec.

NMR δ(CDCl₃):
 6.00 (s, 1, benzyl proton)
 7.50 (m, 5, aromatic)
IR (CHCl₃) absorption maxima:
 1885, 1815 (carbonyl groups)
 1235, 1060 (C-O-C)cm.¹.

Analysis.—Calcd. for C₄H₆O₄: C, 60.67; H, 3.39. Found: C, 60.97; H, 3.39.

EXAMPLE VI

7 - (α - hydroxy) - α - phenylacetamido)-3-(1-methyl-1H-tetrazol - 5 - ylthiomethyl)-3-cephem-4-carboxylic acid, sodium salt In an 800 ml. beaker, 20.9 g. (0.07 m.) of 7-amino-3-(1 - methyl - 1H-tetrazol-5-ylthiomethyl)-3-cephem-4-carboxylic acid was suspended in 320 ml. of water. The pH was adjusted to 6.8 with 5% sodium bicarbonate solution. Anhydro-O-carboxymandelic acid [14.95 g. (0.084 m.), 20% excess] was added over 10 minutes. The pH was maintained for one hour at 6.6–6.8 by addition of 5% sodium bicarbonate solution. To prevent foaming, the mixture was filtered into 300 ml. of ethyl acetate contained in a suction flask. The pH was adjusted to 2.0 with concentrated hydrochloric acid. The layers were separated, and the aqueous layer was washed with 300 ml. of ethyl acetate. The combined organic layers were washed with 200 ml. of water and dried over anhydrous magnesium sulfate. The solution was evaporated to 30 g. of yellow foam which was then dissolved in 400 ml. of ethanol. The sodium salt was precipitated by the addition of 70 ml. of 1M sodium acetate solution in absolute methanol. The thick mixture was stirred in an ice bath for one hour, filtered, washed with 200 ml. of cold ethanol, and dried to give 23.7 g. (70.5%) of 7-(α-hydroxy-α - phenyl - acetamido)-3-(1-methyl-1H-tetrazol-5-ylthiomethyl)-3-cephem-4-carboxylic acid, sodium salt.

NMR δ(D₂O):
 3.30, 3.44 (d, 2, C2)
 3.82 (s, 3, tetrazole-CH₃)
 4.00, 407 (d, 2, C3 methylene)
 4.86, 4.94 (d, 1, C6 proton)

5.17 (s, 1, benzyl proton)
 5.47, 5.54 (d, 1, C7 proton)
 7.33 (s, 5, aromatic proton).
UV (H₂O); $\xi_{269}$—10,500

Polarographic assay indicated 90.3% product.

I claim:
1. A process for preparing a cephalosporin of the formula

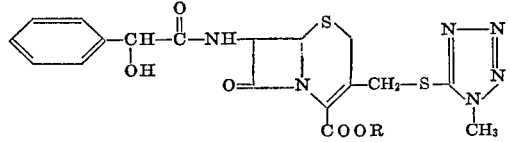

which comprises (1) reacting a 7-acylamido-3-acetoxymethyl compound of the formula

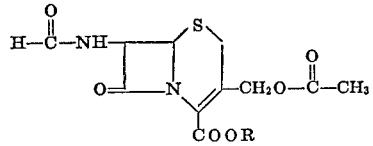

in which R is hydrogen or a carboxy protecting group, with 1-methyl-1H-tetrazole-5-thiol or an alkali, alkaline earth metal or ammonium salt thereof to produce a 7-acylamido-3-(1 - methyl-1H-tetrazol-5-ylthiomethyl) compound of the formula

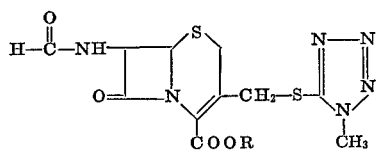

(2) cleaving the 7-acylamido-3-(1-methyl-1H-tetrazol-5-ylthiomethyl) compound to produce a 7-amino-3-(1-methyl-1H-tetrazol-5-ylthiomethyl) compound of the formula

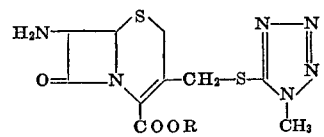

and (3) acylating the resulting 7-amino compound with anhydro-O-carboxymandelic acid having the formula

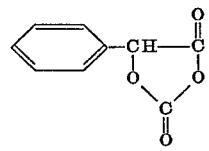

to produce the aforementioned cephalosporin.

2. Process of claim 1, in which R is hydrogen.
3. Process of claim 1, in which R is C₁–C₆ alkyl, 2,2,2-trihaloethyl, C₅–C₇ tert-alkenyl, C₅–C₇ tert-alkynyl, benzyl, nitrobenzyl, tetrahydropyranyl, succinimidomethyl, phthalimidomethyl, methoxybenzyl, dimethoxybenzyl, cyanomethyl, nitrophenyl, dinitrophenyl, 2,4,6-trinitrophenyl, bis(p-methoxyphenyl)methyl, triphenylmethyl, benzhydryl, benzyloxymethyl, C₂–C₆ alkanoyloxymethyl, C₂–C₄ alkanoyl, or phenacyl.
4. Process of claim 1, in which the 7-acylamido-3-acetoxymethyl compound is reacted with the sodium salt of 1-methyl-1H-tetrazole-5-thiol.
5. Process of claim 4, in which the 7-acylamido-3-acetoxymethyl compound is reacted with the methyltetrazolethiol in an aqueous medium at a pH of from 5.0 to 7.0 and at a temperature of from about 50° C. to about 100° C.
6. Process of claim 1, in which the cleavage of the acyl function of the 7-acylamido-3-(1-methyl-1H-tetrazol- 5-ylthiomethyl) compound is carried out in the presence of a lower alkyl alcohol under acidic conditions.

7. Process of claim 6, in which the acyl cleavage reaction is carried out using methanol and concentrated hydrochloric acid.

8. Process of claim 1, in which the acylation of the 7-amino-3-(1-methyl-1H-tetrazol - 5 - ylthiomethyl) compound with anhydro-O-carboxymandelic acid is carried out in an aqueous medium at a pH maintained at from about 6.5 to about 7.0 and at ambient room temperature.

9. Process of claim 1, in which a compound of the formula

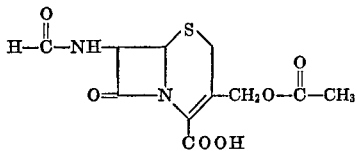

is reacted in an aqueous medium with the sodium salt of 1-methyl-1H-tetrazole-5-thiol at an initial pH of 6.9 and at a temperature of about 70° C. to produce a 7-formamido-3-(1-methyl-1H-tetrazol-5-ylthiomethyl) compound of the formula

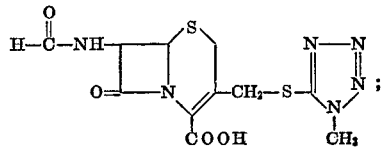

the 7-formamido-3-(1-methyl-1H-tetrazol-5-ylthiomethyl) compound is treated with methanol and concentrated hydrochloric acid to produce a 7-amino compound of the formula

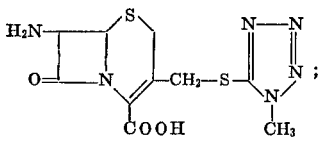

and the 7-amino compound is acylated with anhydro-O-carboxymandelic acid in an aqueous medium at a pH maintained at 6.6–6.8 and at ambient room temperature.

References Cited
UNITED STATES PATENTS

| | | | |
|---|---|---|---|
| 3,516,997 | 6/1970 | Takano et al. | 260—243 C |
| 3,468,874 | 9/1969 | Raap et al. | 260—243 C |
| 3,641,021 | 2/1972 | Ryan | 260—243 C |
| 3,167,549 | 1/1965 | Hoover | 260—243 C |

NICHOLAS S. RIZZO, Primary Examiner

U.S. Cl. X.R.

424—246